US011272120B2

(12) United States Patent
Gouji (10) Patent No.: US 11,272,120 B2
(45) Date of Patent: Mar. 8, 2022

(54) IMAGING DEVICE AND CONTROL METHOD THEREOF

(71) Applicant: CANON KABUSHIKI KAISHA, Tokyo (JP)

(72) Inventor: Kazunori Gouji, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 32 days.

(21) Appl. No.: 16/594,393

(22) Filed: Oct. 7, 2019

(65) Prior Publication Data
US 2020/0112667 A1 Apr. 9, 2020

(30) Foreign Application Priority Data

Oct. 9, 2018 (JP) .............................. JP2018-191003

(51) Int. Cl.
*H04N 5/235* (2006.01)
*G06K 7/10* (2006.01)

(52) U.S. Cl.
CPC ....... *H04N 5/2357* (2013.01); *G06K 7/10752* (2013.01); *H04N 5/2351* (2013.01); *G06K 7/1092* (2013.01)

(58) Field of Classification Search
CPC .............. H04N 5/2357; H04N 5/2351; H04N 5/23254; H04N 5/23287; H04N 5/23258; H04N 5/23209; H04N 5/23261; H04N 5/2353; H04N 13/144; H04N 7/0132; G06K 7/10752; G06K 7/1092; G02B 26/04; G03B 21/40; G09G 1/146
See application file for complete search history.

(56) References Cited

U.S. PATENT DOCUMENTS

| 2010/0123810 A1* | 5/2010 | Greenland ........... H04N 5/2357 348/294 |
| 2011/0221929 A1* | 9/2011 | Miyahara ............. H04N 5/2351 348/226.1 |
| 2012/0194689 A1* | 8/2012 | Kodama .............. H04N 5/2357 348/220.1 |

(Continued)

FOREIGN PATENT DOCUMENTS

| JP | 5419542 B2 | 2/2014 |
| JP | 2016-171541 A | 9/2016 |

*Primary Examiner* — Lin Ye
*Assistant Examiner* — John H Morehead, III
(74) *Attorney, Agent, or Firm* — Cowan, Liebowitz & Latman, P.C.

(57) ABSTRACT

A light measurement processing unit controls the driving of a light measurement sensor in a plurality of drive modes. The light measurement processing unit performs light measurement calculation of obtaining the brightness of a subject when a first drive mode is set and calculation of detecting flicker of a photographed scene when a second drive mode is set. Furthermore, the light measurement processing unit performs calculation of detecting a motion vector of the subject between images of continuous frames in the first drive mode. A camera control unit determines a shutter speed by limiting a speed on a high speed side as compared to when flicker is not detected at the time of panning in light exposure control, when flicker is detected at the time of panning on the basis of the calculation result of the light measurement processing unit.

13 Claims, 7 Drawing Sheets

(56) References Cited

U.S. PATENT DOCUMENTS

| | | | |
|---|---|---|---|
| 2012/0269501 A1* | 10/2012 | Yamamoto | H04N 5/2353 396/238 |
| 2014/0354847 A1* | 12/2014 | Kasai | H04N 5/2353 348/226.1 |
| 2015/0138392 A1* | 5/2015 | Sugawara | H04N 5/2357 348/226.1 |
| 2016/0006919 A1* | 1/2016 | Aoyama | G01J 1/28 348/226.1 |
| 2017/0289452 A1* | 10/2017 | Noda | H04N 5/2352 |
| 2018/0048818 A1* | 2/2018 | Onomura | H04N 5/2357 |
| 2018/0316841 A1* | 11/2018 | Tsuchiya | H04N 5/2352 |
| 2018/0324344 A1* | 11/2018 | Kinoshita | H04N 5/2355 |

* cited by examiner

IMAGING DEVICE AND CONTROL METHOD THEREOF

BACKGROUND OF THE INVENTION

Field of the Invention

The present invention relates to automatic exposure control and imaging control at the time of panning.

Description of the Related Art

Panning in which photographing is performed while tracking a moving subject is a method of photographing at a slow shutter speed while aligning the movement of an imaging device with the moving subject. It is possible to take a dynamic photo by making the background flow while holding a main subject still. However, it is difficult to align an angular velocity at which a camera is moved (hereinafter also referred to as a "panning angular velocity") with a moving speed of a subject in panning. Thus, when a non-familiar user performs panning, a subject may not stand still and blurring is highly likely to occur.

Japanese Patent Laid-Open No. 2016-171541 describes an imaging device having a panning assist control unit for supporting panning of a user. The panning assist control unit corrects image blur (subject blur) of a main subject based on a difference between a main subject angular velocity and a panning angular velocity through drive control of a shift lens.

Incidentally, under a flickering light source such as a fluorescent lamp connected to a commercial power source, a captured image is likely to be affected by flicker in accordance with a set shutter time. The imaging device described in Japanese Patent No. 5419542 can reduce flickering without causing complicated operations even when a user manually designates a set shutter time. When flickering is detected and the set shutter time set by an operation unit is a predetermined value, photographing is performed at the set shutter time at which flickering is reduced on the basis of the detected flicker frequency and the set shutter time.

In the related art disclosed in Japanese Patent Laid-Open No. 2016-171541, a captured image is likely to be affected by flicker in accordance with a set shutter time calculated by the imaging device. Furthermore, in the related art disclosed in Japanese Patent No. 5419542, it is necessary for a user to manually identify a set shutter time. It is difficult for the user to appropriately determine a set shutter time appropriate for panning in accordance with a state of a subject.

SUMMARY OF THE INVENTION

An imaging device according to an embodiment of the present invention is an imaging device including at least one processor and at least one memory functioning as: a processing unit configured to perform a process of detecting flicker in a photographed scene: and a control unit configured to perform exposure control at the time of panning for photographing a moving subject, wherein, when flicker is detected by the processing unit at the time of panning, the control unit limits an upper limit value of a shutter speed which can be set when determining the shutter speed as compared with a case in which flicker is not detected at the time of panning.

Further features of the present invention will become apparent from the following description of exemplary embodiments with reference to the attached drawings.

DESCRIPTION OF THE EMBODIMENTS

Preferred embodiments of the present invention will be described in detail on the basis of the attached drawings. In this embodiment, a digital camera having a function of panning assist for supporting panning (hereinafter simply referred to as a "camera") is exemplified. A control mode when setting for panning assist is performed is referred to as a "panning assist mode." It should be noted that, although control at the time of panning of an imaging device will be explained, the present invention can also be applied to control at the time of tilting.

Figure 1:
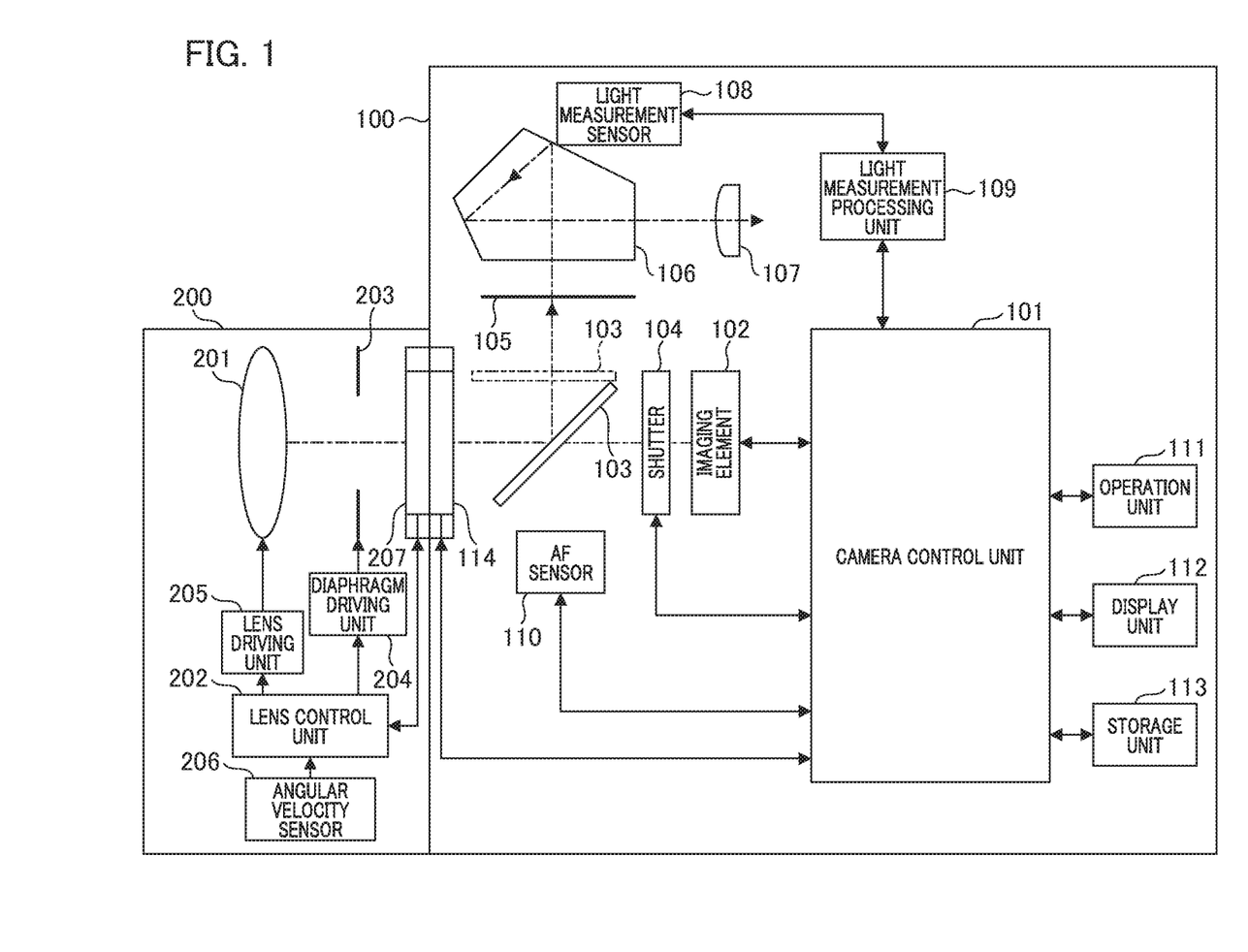
FIG. 1 is a block configuration diagram illustrating an imaging device according to an embodiment of the present invention.

FIG. 1 is a block configuration diagram illustrating an imaging device according to an embodiment. The imaging device includes a camera main body part 100 and a lens unit 200. The lens unit 200 is an interchangeable lens which can be attached to and detached from the camera main body part 100. The lens unit 200 includes a lens unit 201 which constitutes an imaging optical system. The lens unit 201 is constituted of, for example, a plurality of lenses, but for simplification of the illustrative drawings, one lens is illustrated in FIG. 1. In the following description, a subject side is defined as a side in front of the lens and a positional relationship between constituent elements will be described.

A lens control unit 202 included in the lens unit 200 includes a central processing unit (CPU) and controls constituent elements in the lens unit 200. For example, the lens control unit 202 controls a diaphragm 203 to be driven via a diaphragm driving unit 204. Furthermore, the lens control unit 202 moves a movable lens (a focus lens) in the lens unit 201 along an optical axis via a lens driving unit 205 to change a position thereof, thereby performing focus adjustment control.

An angular velocity sensor 206 may be, for example, a gyro sensor, detect an angular velocity of shaking of the lens unit 200, converts information concerning the angular velocity into an electrical signal, and outputs the electrical signal to the lens control unit 202. The lens control unit 202 performs image blur correction control for the subject by driving an image blur correction lens (a shift lens) in the lens unit 201 via the lens driving unit 205 on the basis of the angular velocity information from the angular velocity sensor 206.

The lens control unit 202 can communicate with a camera control unit 101 in the camera main body part 100 via communication terminals 207 and 114. The communication terminal 207 included in the lens unit 200 is electrically connected to the communication terminal 114 included in the camera main body part 100 when the lens unit 200 is installed in the camera main body part 100.

The camera control unit 101 includes a microcomputer which includes a CPU, a read only memory (ROM), and a random access memory (RAM). The CPU executes a program stored in the ROM to control the entire imaging device.

An imaging element 102 outputs an electrical signal according to light incident through the lens unit 200. For the imaging element 102, for example, complementary metal oxide semiconductor (CMOS) type image sensors or charge coupled device (CCD) type image sensors may be used. An image signal photoelectrically converted by the imaging element 102 is output to the camera control unit 101.

A main mirror 103 is disposed on an optical axis of the lens unit 200 (hereinafter referred to as a "photographing optical path"). The main mirror 103 is rotatable in accordance with an operation state of the imaging device. When a user observes the subject through a finder, the main mirror 103 is inclined with respect to the photographing optical path (indicated by a broken line in the drawing) as indicated by a solid line. Thus, an optical image of light incident through the lens unit 200 is guided to a finder optical system. On the other hand, at the time of photographing or live view display, the main mirror 103 retracts from the photographing optical path as indicated by an alternate long and two short dashes line. Thus, an optical image of light incident through the lens unit 200 is guided to the imaging element 102.

A shutter 104 is disposed behind the main mirror 103 and controls a time at which the imaging element 102 is exposed to light incident through the lens unit 200. The shutter 104 is driven and controlled through the camera control unit 101 and is opened at the time of photographing and live view display.

A focusing plate 105 is disposed above the main mirror 103. The focusing plate 105 is disposed on a primary imaging surface of the lens unit 200, a Fresnel lens (a condenser lens) is provided on an incident surface thereof, and an optical image (a finder image) of the subject is formed on an outgoing surface.

A pentaprism 106 is an optical member through which a finder optical path is changed and converts a subject image formed on the outgoing surface of the focusing plate 105 into an erect image. An eyepiece lens 107 can adjust the diopters in accordance with the user's eye when the user looks into the finder. An optical system constituted of the focusing plate 105, the pentaprism 106, and the eyepiece lens 107 is referred to as a finder optical system.

A light measurement sensor 108 is disposed in the vicinity of the pentaprism 106. The light measurement sensor 108 includes a plurality of photodiodes corresponding to a plurality of regions obtained by dividing an imaging region. The light measurement sensor 108 detects the luminance of a subject image formed on the outgoing surface of the focusing plate 105 and outputs the subject image to a light measurement processing unit 109.

The light measurement processing unit 109 includes a microprocessor which includes a CPU, a ROM, and a RAM and executes a program stored in the ROM to drive of the light measurement sensor 108 and to perform light measurement calculation, vector detection calculation, and the like using an output of the light measurement sensor 108. For example, the light measurement processing unit 109 performs accumulation driving and reading driving on the light measurement sensor 108 at predetermined time intervals (that is, a light measurement timing) and measures time-series variation of a light measurement value (that is, an amount of light). The light measurement processing unit 109 analyzes time-series variation of a light measurement value that is light measurement results obtained through measurement and detects the presence or absence of a flickering light source, a flicker frequency, and a peak timing (a phase) of flickering. The vector detection calculation is a calculation used for detecting a motion vector of a subject in an image from image data of frames continuous in time series and the details thereof will be described later.

An auto focus (AF) sensor 110 receives reflected light from a sub-mirror (not shown), calculates an amount of defocusing according to an amount of deviation between a pair of images using a phase difference type AF, and outputs the amount of defocusing to the camera control unit 101. The sub-mirror is positioned behind the main mirror 103 in an inclined state and guides a part of light which has been incident through the lens unit 200 and transmitted through the main mirror (a half mirror) 103 to the AF sensor 110. The camera control unit 101 determines an amount of lens driving and a drive direction of the focus lens in the lens unit 201 on the basis of the amount of defocusing obtained through the AF sensor 110. The camera control unit 101 transmits control commands of the amount of lens driving and the drive direction to the lens control unit 202 via the communication terminals 114 and 207. The lens control unit 202 which has received these control commands controls the lens driving unit 205, moves the focus lens in the lens unit 201 along the optical axis in accordance with the commanded amount of lens driving and drive direction, and performs focus adjustment control.

An operation unit 111 receives an operation instruction from the user and outputs an operation instruction signal to the camera control unit 101. The operation unit 111 may include an operation dial, a photographing instruction button, input devices such as various operation buttons and a touch panel, and an input apparatus using speech, a line of sight, or the like. For example, the operation unit 111 mayx include first and second switches configured to perform turning on/off in accordance with an operation of a release button. When the user half-presses the release button, the first switch of the release switch (referred to as "SW1") is turned on. Thus, it is possible to instruct the imaging device to start operations such as AF processing, automatic exposure (AE) processing, auto white balance (AWB) processing, and EF (strobe pre-flash) processing. When the user further performs a full-pressing operation of the release button, the second switch (referred to as "SW2") of the release button is turned on and it is possible to instruct the imaging device to start a photographing operation. Furthermore, the operation unit 111 includes a switch for setting a panning assist mode.

A display unit 112 includes an image display device such as a liquid crystal display (LCD) and displays an image and information concerning photographing. An image according to image data obtained by performing image processing on a signal output from the imaging element 102 is displayed on a screen of the display unit 112.

A storage unit 113 includes various storage devices configured to store various pieces of data including image data. The camera control unit 101 performs light exposure control of the imaging element 102, performs image processing on an output signal of the imaging element 102 to generate image data, and performs a process of storing the generated image data in the storage unit 113. The storage unit 113 is removable from the camera main body part 100, for example, like a semiconductor memory card.

Figure 2:
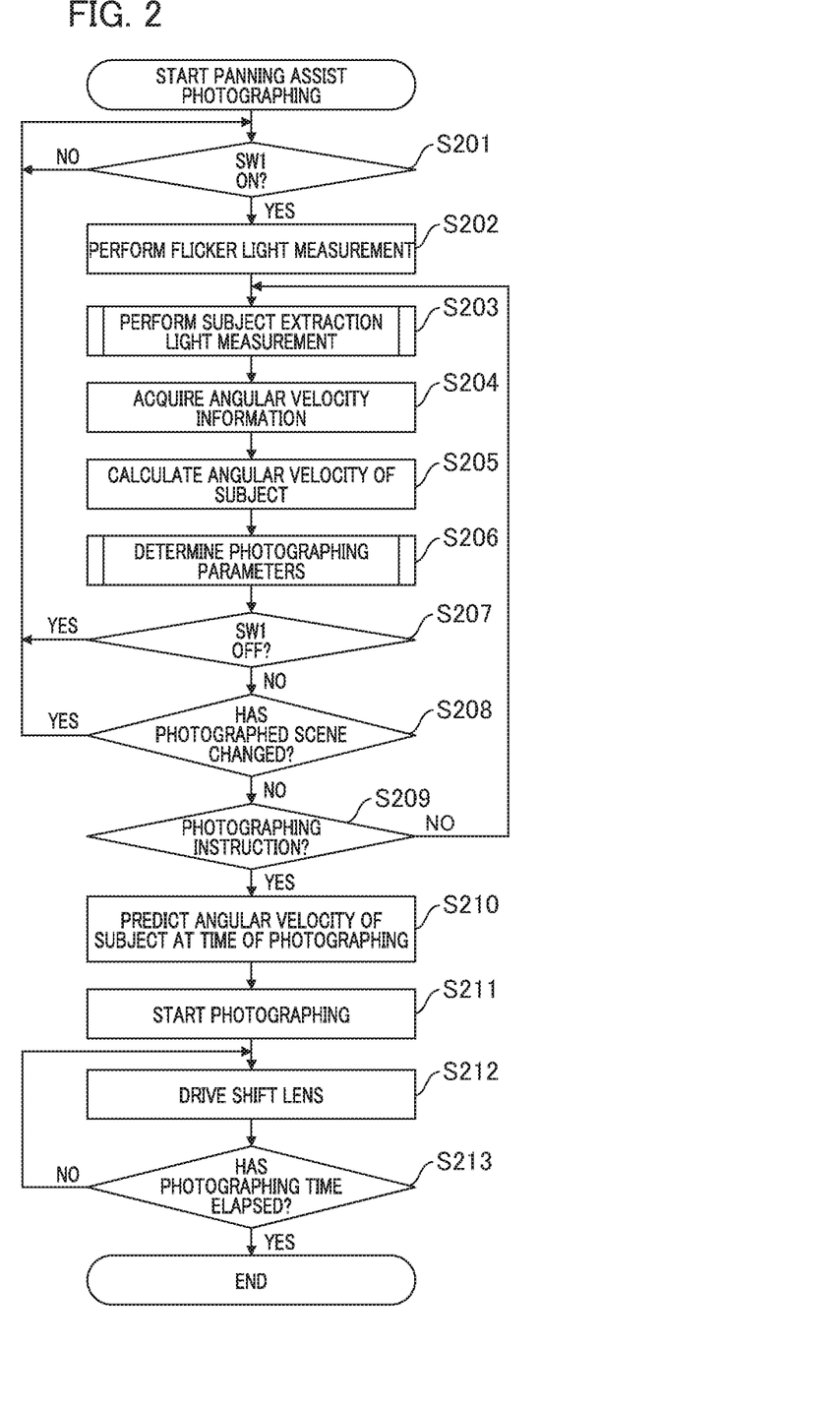
FIG. 2 is a flowchart for explaining a photographing process in the embodiment of the present invention.

A photographing sequence in the panning assist mode in this embodiment will be described with reference to a flowchart of FIG. 2. It should be noted that it is assumed that the subject performs a uniform linear motion and the user moves the imaging device to follow the movement of the subject, thereby performing panning.

In S201, the camera control unit 101 determines whether a photographing preparation instruction has been issued due to a user's operation. The photographing preparation instruction can be determined, for example, on the basis of whether or not the user has half-pressed the release button and thus the first switch SW1 is turned on. The camera control unit 101 determines that the photographing preparation instruction has been issued by turning on the first switch SW1. It should be noted that an AF start instruction and a light measurement start instruction may be treated as a photographing preparation instruction. When it is determined that the photographing preparation instruction has been issued, the process proceeds to a process of S202, and when it is determined that the photographing preparation instruction has not been issued, the determination process of S201 is repeatedly performed.

In S202, flicker light measurement is performed. The flicker light measurement is light measurement for detecting a flickering light source and the camera control unit 101 instructs the light measurement processing unit 109 to perform flicker light measurement. The light measurement processing unit 109 drives the light measurement sensor 108 to acquire flicker information. The details of the flicker light measurement will be described later with reference to FIG. 3. After the process of S202, the process proceeds to a process of S203.

In S203, the camera control unit 101 instructs the light measurement processing unit 109 to perform subject extraction light measurement and the light measurement processing unit 109 performs the subject extraction light measurement. The subject extraction light measurement will be described later with reference to FIGS. 4 and 5. In the next S204, the camera control unit 101 acquires angular velocity information detected by the angular velocity sensor 206 from the lens control unit 202 via the communication terminals 207 and 114. In a state in which the lens unit 200 is installed in the camera main body part 100, the lens unit 200 and the camera main body part 100 move in an integrated manner. Thus, the angular velocity detected by the angular velocity sensor 206 can be treated as being equivalent to the angular velocity of the camera main body part 100.

In S205, the camera control unit 101 calculates the angular velocity of the subject and stores the calculated angular velocity in the RAM in the camera control unit 101. In S206, the camera control unit 101 determines photographing parameters. The photographing parameters mentioned therein are parameters used for determining the brightness of an image at the time of photographing such as a shutter speed, a diaphragm value, ISO sensitivity, and the like. The determination process of the photographing parameters will be described later with reference to FIG. 7.

In S207, the camera control unit 101 determines whether the photographing preparation instruction has been canceled. When it is determined that the photographing preparation instruction has been canceled, for example, when the first switch SW1 is turned off, the process returns to the process of S201 and waits until the photographing preparation instruction is issued again. On the other hand, when it is determined that the photographing preparation instruction has not been canceled, the process proceeds to a process of S208. In addition to the method of determining that the photographing preparation instruction has been canceled when the first switch SW1 is turned off, there is a method of determining whether the photographing preparation instruction has been temporarily canceled when an AF or light measurement repeat instruction has been issued and determining whether the photographing preparation instruction has been issued again.

In S208, the camera control unit 101 determines whether a photographed scene has changed. For example, it is possible to determine whether the photographed scene has changed when a temporal change of a light measurement value (S405 in FIG. 4) is observed and it is determined that the light measurement value has changed by a predetermined value or more. Alternatively, the determination concerning a change in photographed scene may be performed on the basis of the motion vector detection result (S409 in FIG. 4) and subject information (S410 in FIG. 4). Furthermore, a scene of the subject may be estimated using the output result of the light measurement sensor 108 and a change in photographed scene may be determined. When it is determined in S208 that the photographed scene has changed, the process returns to the process of S201, and when it is determined that the photographed scene has not changed, the process proceeds to a process of S209.

In S209, the camera control unit 101 determines whether a photographing instruction has been issued. To be specific, when the second switch SW2 is turned on due to the full-press operation of the release button, it is determined that a photographing instruction has been issued and thus the process proceeds to a process of S210. When the second switch SW2 is turned off, it is determined that a photographing instruction has not been issued and thus the process returns to the process of S203.

In S210, the camera control unit 101 performs a process of predicting an angular velocity of the subject at the time of exposure. Even when the subject has a uniform linear motion, it can be seen that the subject is in an acceleration motion if the angular velocity of the subject is calculated as an angular velocity of the subject when viewed from the imaging device. For this reason, an angular velocity of the subject at the time the second switch SW2 is turned on may be different from an angular velocity of the subject at the time of exposure. In S210, the process of predicting an angular velocity of the subject at the time of exposure is performed using the angular velocity of the subject at the time the second switch SW2 is turned on, a time lag from this time to a light exposure operation, and history data of the angular velocity of the subject stored in S205.

In S211, the camera control unit 101 controls the shutter 104 such that a shutter movement is started and performs light exposure control of the imaging element 102. In the next S212, the camera control unit 101 controls driving of the image blur correction lens (the shift lens) in the lens unit 201 such that panning assist is performed. The lens control unit 202 receives the control command of the camera control unit 101 via the communication terminals 114 and 207. The lens control unit 202 performs drive control of the shift lens via the lens driving unit 205. A drive pattern of the shift lens is determined using information concerning the angular velocity of the subject acquired in S210. It should be noted that, as a method of panning assist, instead of a method of driving the shift lens, a method of driving the imaging element 102 or a method of driving both of the shift lens and the imaging element 102 may be used.

In S213, the camera control unit 101 determines whether the light exposure time set on the basis of the AE calculation has elapsed. While the exposure time set in a current photographing has not elapsed, the drive control of the shift lens continues in S212. When it is determined in S213 that the set exposure time has elapsed, the series of process ends.

Figure 3:
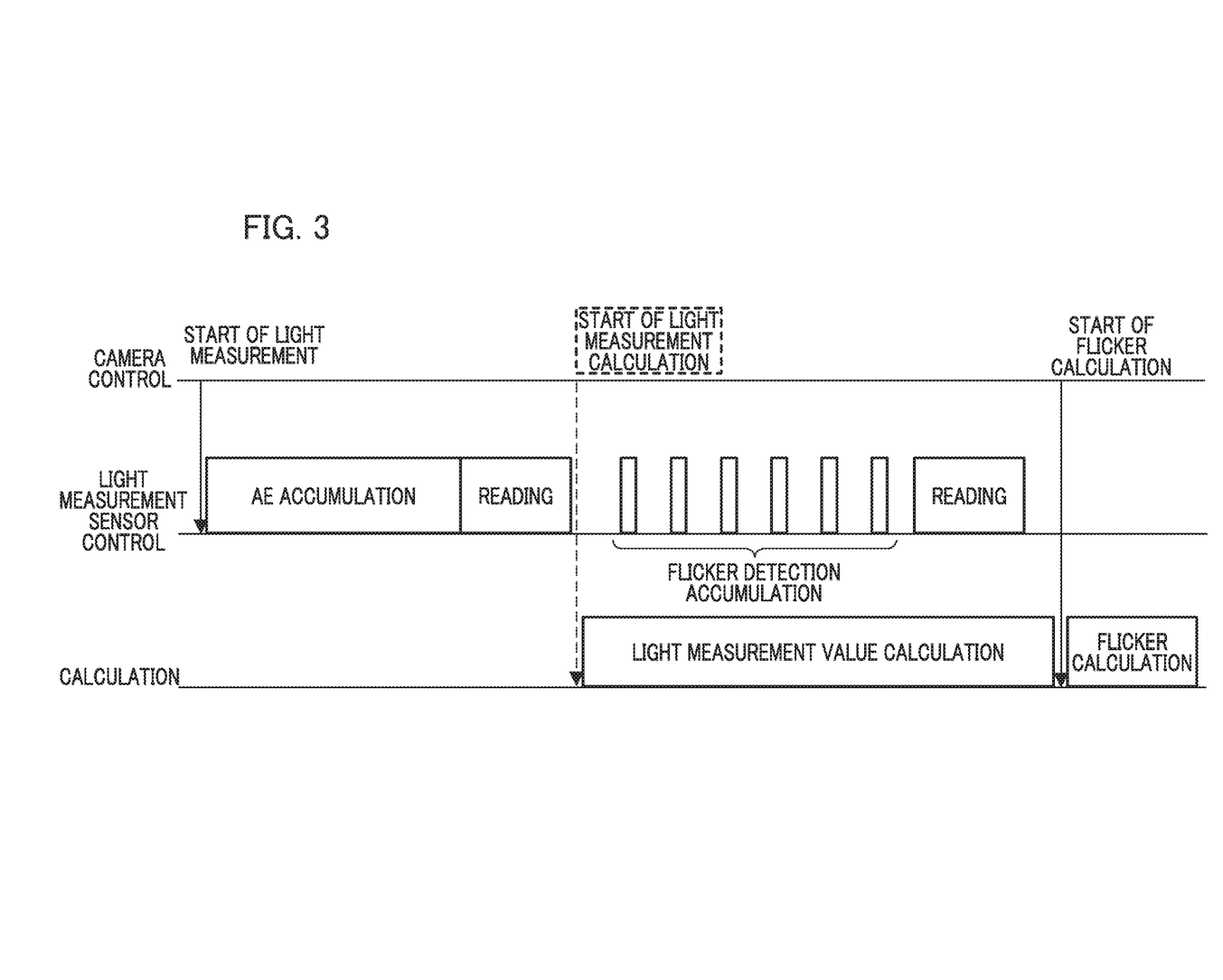
FIG. 3 is a timing chart for explaining the flicker light measurement illustrated in FIG. 2.

The flicker light measurement illustrated in S202 of FIG. 2 will be described below with reference to FIG. 3. FIG. 3 is an explanatory illustration of camera control, light measurement sensor control, and arithmetic processing. The light measurement processing unit 109 first sets driving of the light measurement sensor 108 to a first drive mode and performs accumulation (hereinafter referred to as "AE accumulation") for obtaining the luminance of the subject. After the completion of the AE accumulation, a process of reading accumulation data from the light measurement sensor 108 is performed and a process of calculating the luminance of the subject is performed. Subsequently, the light measurement processing unit 109 sets driving of the light measurement sensor 108 to a second drive mode and performs accumulation by intermittently driving the light measurement sensor 108 a plurality of times (hereinafter referred to as "accumulation for flicker detection"). After the completion of the accumulation for flicker detection, a process of reading accumulation data from the light measurement sensor 108 is performed and a process of calculating flicker information of the subject from the read data is performed. The flicker information is, for example, the presence or absence of a flicker light source and a period, a frequency, or a phase (a peak timing) of flicker. It should be noted that, since image sizes and photographing parameters are different between AE accumulation according to the setting of the first drive mode and accumulation for flicker detection according to the setting of the second drive mode, motion vector detection between images cannot be performed between these accumulations.

Figure 4:
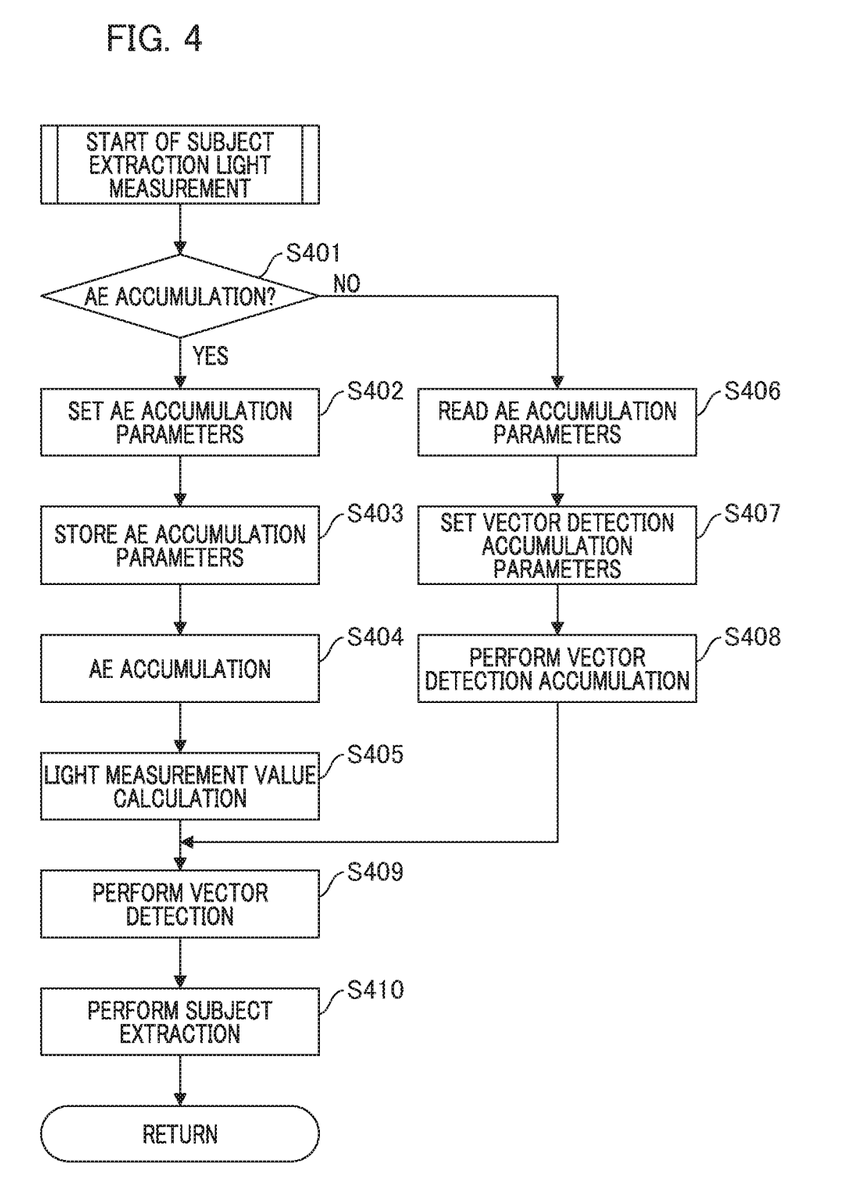
FIG. 4 is a flowchart for explaining the subject extraction light measurement illustrated in FIG. 2.

The subject extraction light measurement illustrated in S203 of FIG. 2 will be described with reference to FIGS. 4 and 5. FIG. 4 is a flowchart for describing a process of the subject extraction light measurement in detail. In this embodiment, AE accumulation and accumulation for vector detection are alternately performed. The details of the accumulation for vector detection will be described later.

In S401, the light measurement processing unit 109 determines whether AE accumulation is to be performed. When it is determined that the AE accumulation is to be performed, the process proceeds to a process of S402, and when it is determined that AE accumulation is not to be performed, the process proceeds to a process of S406.

In S402, the light measurement processing unit 109 sets accumulation parameters. The accumulation parameters include image size, gains, accumulation times, and the like, which vary in accordance with sensors to be used. In S403, the light measurement processing unit 109 stores the parameters set in S402 in the RAM. In S404, the light measurement processing unit 109 drives the light measurement sensor 108 on the basis of the accumulation parameters set in S402 to perform AE accumulation. After the completion of the AE accumulation, in S405, the light measurement processing unit 109 performs light measurement value calculation to calculate a representative luminance of the subject. After the process of S405, the process proceeds to the process of S409.

S406 to S408 indicate a sequence of accumulation for vector detection performed when it is determined in S401 that AE accumulation is not to be performed. In S406, the light measurement processing unit 109 reads the accumulation parameters which have been stored in the RAM in S403. In S407, the light measurement processing unit 109 set accumulation parameters. Using the parameters which have been stored in S403 as the accumulation parameters, the accumulation for vector detection can be performed under the same conditions as in the AE accumulation.

In S408, the light measurement processing unit 109 drives the light measurement sensor 108 on the basis of the accumulation parameters which have been set in S407 to perform the accumulation for vector detection. In S409, the light measurement processing unit 109 performs motion vector detection between images of consecutive frames using data of images acquired after S404 and S408.

In S410, the light measurement processing unit 109 extracts a subject region and a background region in an image from the motion vector which has been acquired in S409 and ends this process. There are various methods of extracting a subject region and a background region from a motion vector such as a method using template matching and the like. Thus, description thereof will be omitted in this description. It should be noted that, when a subject region cannot be extracted in S410, an angular velocity of the subject cannot be calculated in S205 of FIG. 2. Thus, a panning assist function cannot be realized. In this case, it is possible to perform switching to photographing in which normal image blur correction is performed without driving the shift lens for panning assist in S212.

Figure 5:
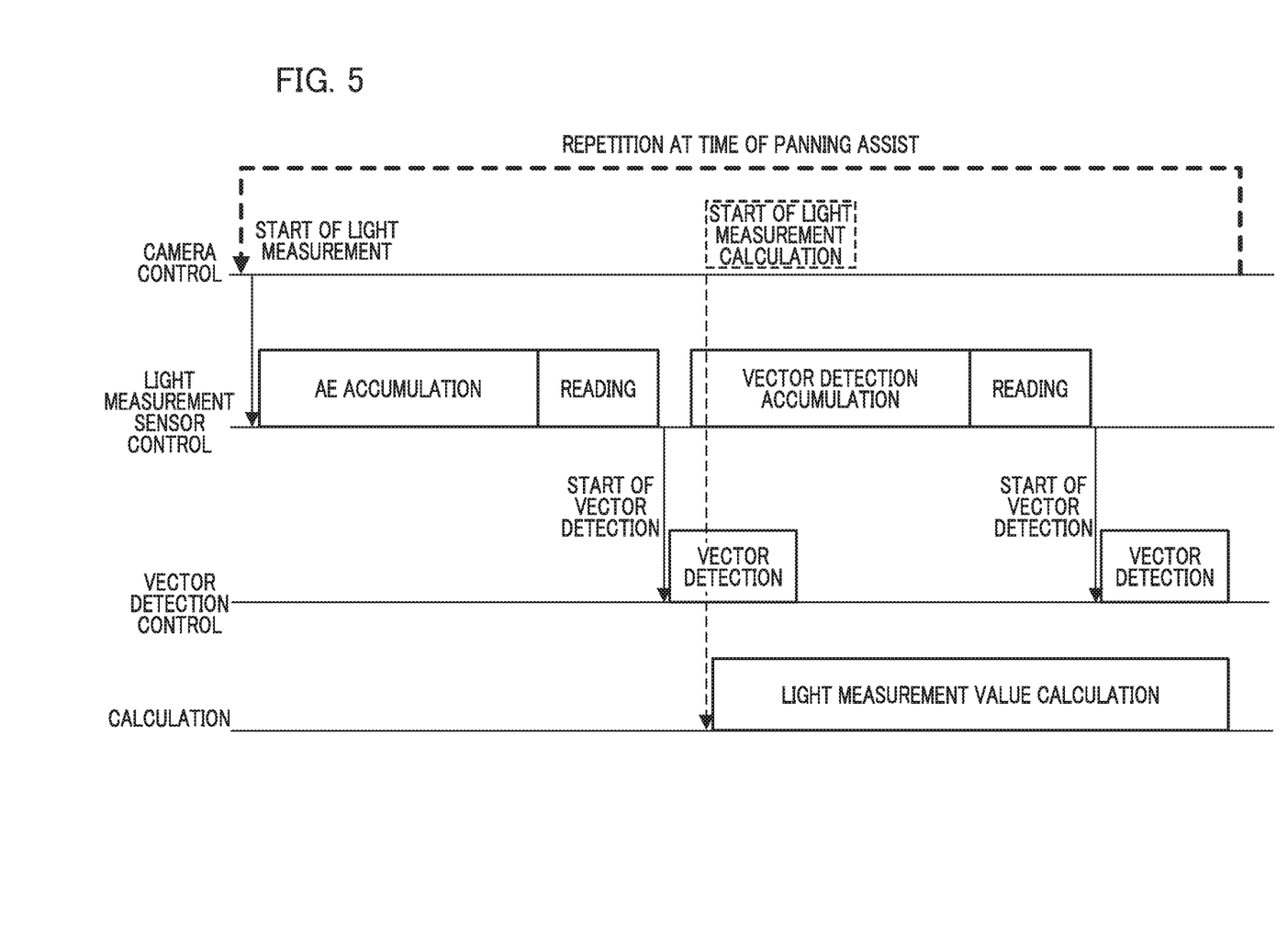
FIG. 5 is a timing chart for explaining the subject extraction light measurement illustrated in FIG. 4.

FIG. 5 illustrates a timing chart of the subject extraction light measurement described in association with FIG. 4. In the subject extraction light measurement, the accumulation for flicker detection which is performed in the flicker detection light measurement of FIG. 3 is not performed and the accumulation for vector detection that is accumulation for motion vector detection is performed.

Focusing on the control of the light measurement sensor 108, after the AE accumulation and reading have been performed, the accumulation for vector detection and the reading are performed and this operation is repeatedly performed. Motion vector detection processes between a plurality of frames are all performed after AE accumulation and reading and after accumulation for vector detection and reading, but light measurement value calculation is performed only wien AE accumulation and reading are performed. In this way, by replacing the accumulation for flicker detection illustrated in FIG. 3 with accumulation for vector detection, both motion vector detection and light measurement at a high frame rate can be achieved.

A process of calculating the angular velocity of the subject illustrated in S205 of FIG. 2 will be described with reference to FIG. 6. In this embodiment, in order to perform the calculation together with a panning angular velocity, a process of calculating the angular velocity of the subject centering on a principal point is performed. The method of calculating an angular velocity will be described using a circular measure method.

Figure 6:
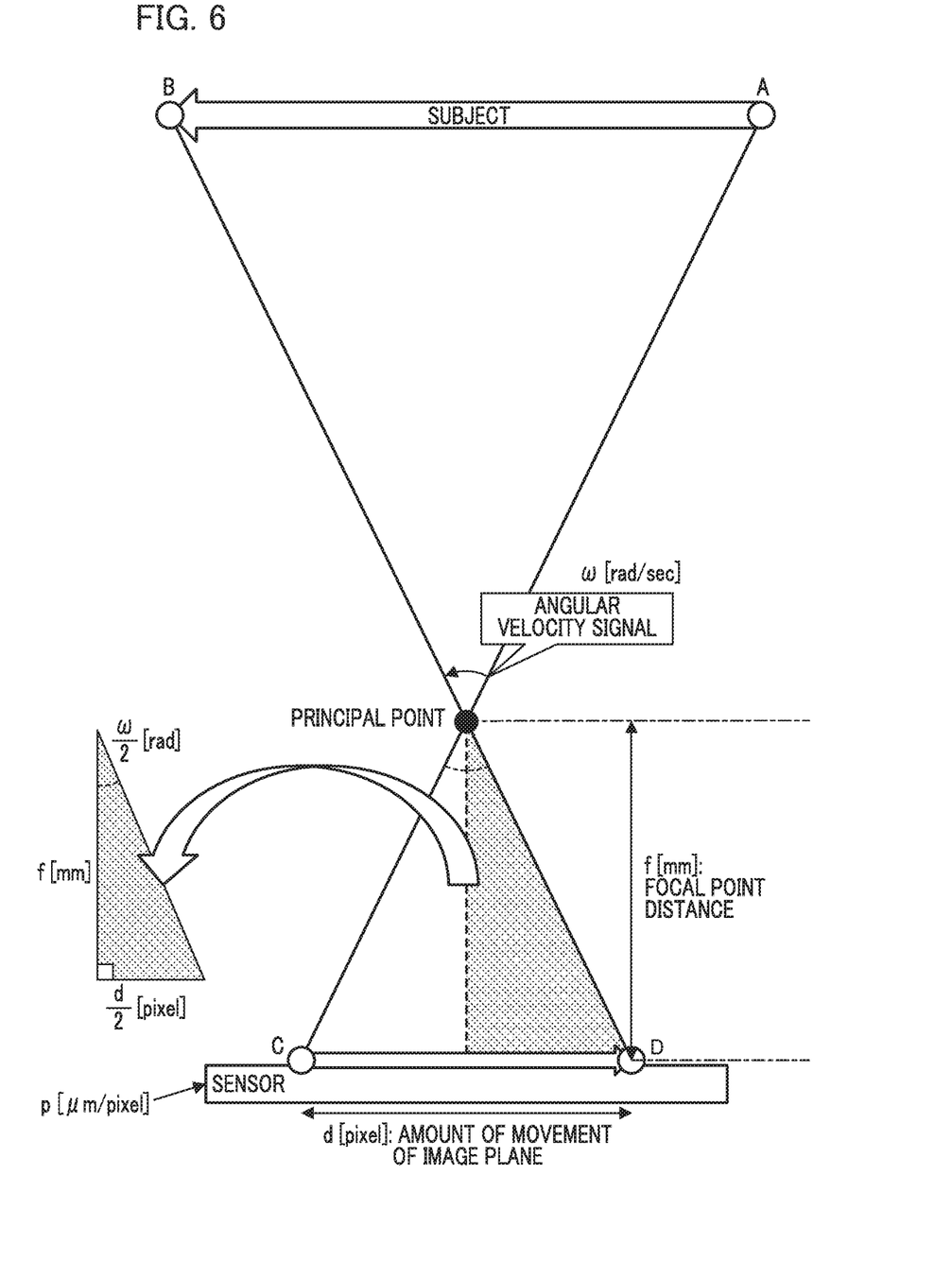
FIG. 6 is an explanatory view of a calculation process of an angular velocity of a subject illustrated in FIG. 2.

FIG. 6 schematically illustrates a situation in which the subject moves from point A to point B in t seconds, and an image of the subject formed on an image surface of the imaging element moves from point C to point D accordingly. Here, a distance between point C and point D is set to d [pixel], a focal length is set to f [mm], and a pixel pitch of the image element is set to p [μm/pixel]. When an angular velocity of the subject on the image surface is set to ω [rad/sec], ω can be represented by the following expression (Expression 1):

$$\tan\frac{\omega}{2}[\text{rad/sec}] = \frac{d}{2}[\text{pixel}] \times \frac{p}{1000}[\text{mm/pixel}] \div t[\text{sec}] \div f[\text{mm}] = \frac{dp}{2000tf}$$

(Expression 1)

-continued $$\omega = 2\tan^{-1}\left(\frac{dp}{2000tf}\right) \text{ [rad/sec]}.$$

Assuming that a photographer is panning the imaging device, an angular velocity of the subject itself relative to the imaging device (a subject angular velocity) is set to $\omega_s$ and a panning angular velocity is set to $\omega_p$. An angular velocity $\omega$ of the subject on the image surface is a value obtained by subtracting $\omega_p$ from $\omega_s$ as in the following expression (Expression 2):

$$\omega = \omega_s - \omega_p \quad \text{(Expression 2)}.$$

Therefore, a subject angular velocity $\omega_s$ is calculated by adding the panning angular velocity $\omega_p$ of the imaging device which has been detected by the angular velocity sensor 206 to the angular velocity $\omega$ of the subject on the image surface as in the following expression (Expression 3):

$$\omega_s = \omega + \omega_p \quad \text{(Expression 3)}.$$

Figure 7:
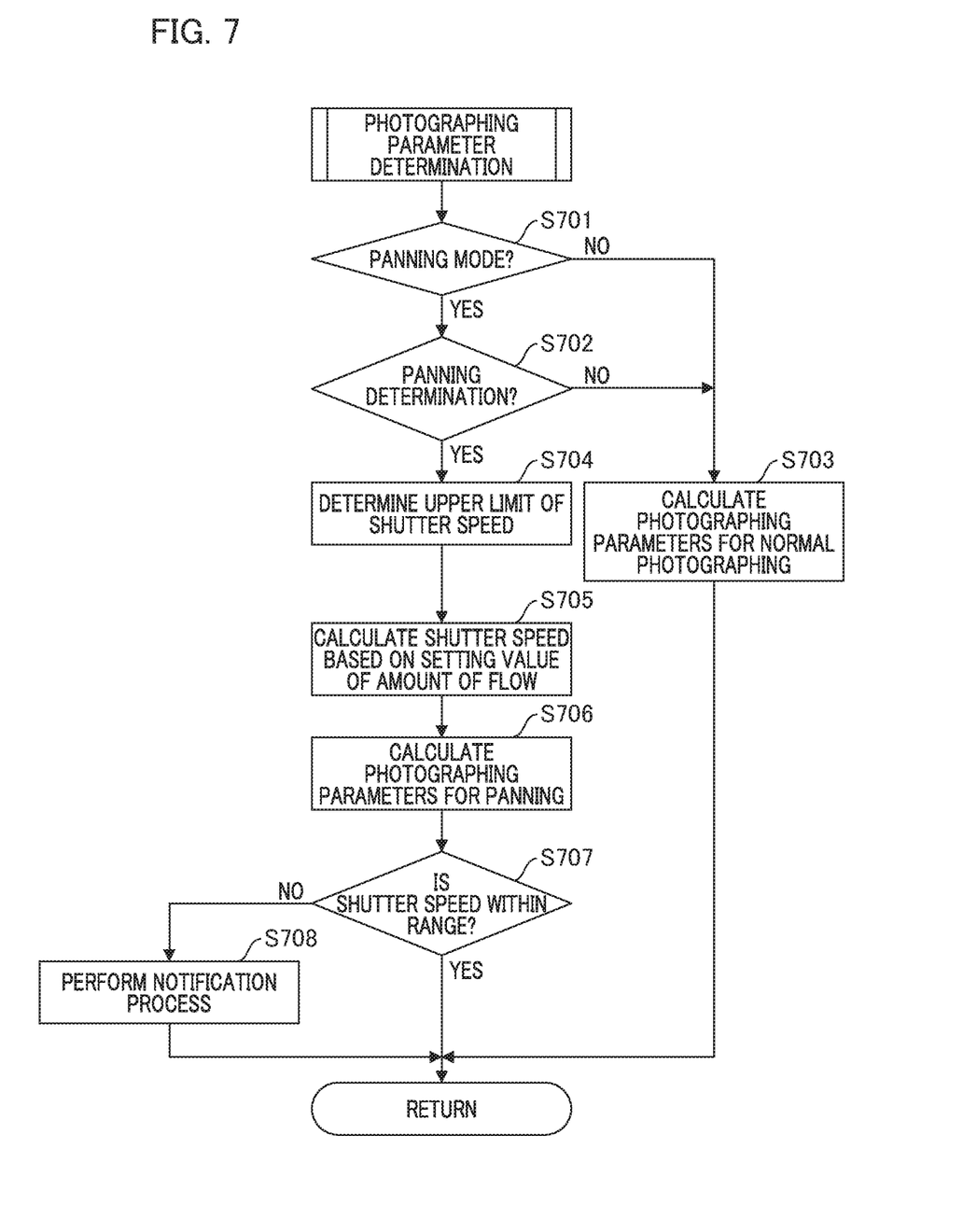
FIG. 7 is a flowchart for explaining a photographing parameters determination process illustrated in FIG. 2.

A process of determining the photographing parameters illustrated in S206 of FIG. 2 will be described below with reference to FIG. 7. In S701, the camera control unit 101 determines whether a mode of performing panning is set. When it is determined that the mode of performing panning is set, the process proceeds to a process of S702, and when it is determined that this mode is not set, the process proceeds to a process of S703. The mode in which the panning is performed is set, for example, by the user who operates the operation unit 111.

In S702, the camera control unit 101 determines whether the user has performed panning. When it is determined that the panning is performed, the process proceeds to a process of S704, and when it is determined that the panning is not performed, the process proceeds to a process of S703. The determination process of S702 is performed, for example, using the angular velocity information acquired in S204 of FIG. 2 and angular velocity information of the subject calculated in S205. When the imaging device is moving at a constant panning angular velocity and the angular velocity of the subject on an image plane is near zero, it is determined that the user is performing panning.

In S703, the camera control unit 101 calculates photographing parameters for normal photographing. The normal photographing is photographing that is not specialized for panning. After the processing of S703, the process transitions to return processing.

In S704, the camera control unit 101 determines an upper limit value (referred to as Tv_max) of the shutter speed. The upper limit value Tv_max indicates a settable shortest light exposure time and is used in the calculation of S706 which will be described later. For example, it is assumed that a mode of reducing an influence of flicker at the time of photographing is set using the operation unit 111 and flicker is detected in S202 of FIG. 2. In this case, the camera control unit 101 sets Tv_max not to be affected by flicker at the time of photographing. For example, a shutter speed corresponding to a light exposure time including a predetermined number of flicker cycles is referred to as Tv_th. When the shutter speed at the time of photographing is controlled to be longer than Tv_th, it is possible to perform photographing with a reduced influence of flicker. Furthermore, when the mode of reducing the influence of flicker is not set or when a flicker light source is not detected, the camera control unit 101 sets a shutter speed which can be controlled using the imaging device to Tv_max. After S704, the process proceeds a process of S705.

In S705, the camera control unit 101 calculates a shutter speed (referred to as Tv_p) on the basis of a setting value of an amount of background flow. It is assumed that the amount of background flow at the time of panning is input in advance using the operation unit 111. The shutter speed Tv_p is calculated to obtain a desired amount of flow. This calculation is performed, for example, using the setting value of the amount of background flow and the motion vector information of the background region calculated in S410 of FIG. 4. With regard to the shutter speed, the larger the setting value of the amount of background flow and the smaller the magnitude of the motion vector of the background region, the longer the tendency to be calculated on the side. Although the calculation using the setting value of the amount of background flow has been described in association with S705, a setting range (a selectable range of a setting value) of the amount of background flow due to the user's operation is limited when the mode of reducing an influence of flicker at the time of panning is set. For example, the camera control unit 101 sets a setting value smaller than a predetermined amount as unselectable so that a small option cannot be selected in a configuration in which there are large, middle, and small options as amounts of background flow. Thus, it can be suppressed that the shutter speed Tv_p is calculated on a short second side. After S705, the process proceeds to a process of S706.

In S706, the camera control unit 101 calculates photographing parameters for panning using the light measurement value calculated in S405 of FIG. 4. Tv_max determined in S704, and Tv_p calculated in S705. Here, when the shutter speed Tv_p is higher than the upper limit value Tv_max, calculation of imaging parameters is performed with a priority given to Tv_max. That is to say, the shutter speed is limited by the upper limit value. The reason is that a priority is given to photographing in which the influence of flicker is reduced. After S706, the process proceeds to a process of S707.

In S707, the camera control unit 101 determines whether the shutter speed at the time of photographing in panning is within a predetermined threshold range corresponding to Tv_p calculated in S705. When the shutter speed is within the threshold range, the process ends and the process proceeds to the return process. When the shutter speed is outside of the threshold range, the process proceeds to a process of S708. In S708, the camera control unit 101 notifies the user that the amount of background flow set by the user's operation cannot be obtained. For example, after a process of displaying a predetermined message on the display unit 112 or performing a notification using voice or the like is performed, the process shifts to return the process. When the shutter speed is outside of the threshold range and a photographing instruction is given in S209, the shutter speed is set to the upper limit value Tv_max and photographing is performed. As described above, by giving a priority to reduce the influence of flicker rather than obtaining a desired amount of background flow, it is possible to perform photographing with reduced influence of flicker in panning under a flicker light source. It should be noted that a configuration may be provided to have a first imaging mode which prioritizes reducing the influence of flicker rather than obtaining a desired amount of background flow and a second imaging mode which prioritizes obtaining a desired amount of background flow rather than reducing the effect of flicker. The user can select a desired mode. In the second imaging mode, if the imaging instruction is issued in S209 when the shutter speed is outside of the threshold range, imaging is performed with the shutter speed Tv_p calculated in S705. In such a configuration, in S708, the user may be notified that the desired amount of background flow cannot be obtained in the first imaging mode and the user may be notified that the influence of flicker cannot be reduced in the second imaging mode. As described above, by making it possible for the user to select which one to prioritize, it is possible to perform photographing with reduced influence of flicker in panning under a flicker light source by reflecting the user's intention more.

According to this embodiment, it is possible to provide an imaging device capable of performing panning with reduced influence of flicker. In this embodiment, an example in which the light measurement sensor 108 is used has been described. However, the control may be performed with a so-called live view image using the imaging element 102 which acquires captured image data.

(Other Embodiments)

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-191003, filed Oct. 9, 2018 which is hereby incorporated by reference wherein in its entirety.

What is claimed is:

1. An imaging device comprising
at least one processor and at least one memory functioning as:
a processing unit configured to perform a process of detecting flicker of a photographed scene; and
a control unit configured to perform exposure control at the time of panning for photographing a moving subject,
wherein, when flicker is detected by the processing unit at the time of panning, the control unit limits an upper limit value of a shutter speed which can be set when determining the shutter speed as compared with a case in which flicker is not detected at the time of panning, and
wherein the processing unit performs a light measurement calculation process of setting driving of a light measurement sensor to a first drive mode and acquiring brightness of the subject and a process of setting the driving of the light measurement sensor to a second drive mode to detect flicker of a photographed scene.

2. The imaging device according to claim 1, wherein the processing unit switches the driving of the light measurement sensor to the second drive mode to perform calculation of detecting flicker when a photographing preparation instruction is issued and then switches the driving of the light measurement sensor to the first drive mode and repeatedly performs acquisition of image data in the first drive mode until a photographing instruction is issued.

3. The imaging device according to claim 2, wherein the processing unit switches from the first drive mode to the second drive mode when the photographing preparation instruction is issued again after the photographing preparation instruction has been issued and performs an operation of detecting flicker, and then switches the driving of the light measurement sensor to the first drive mode and repeatedly performs acquisition of image data in the first drive mode until a photographing instruction is issued.

4. The imaging device according to claim 2, wherein, when the control unit determines that the photographed scene has changed, the processing unit switches from the first drive mode to the second drive mode and performs an operation of detecting flicker, and then switches the driving of the light measurement sensor to the first drive mode and repeatedly performs acquisition of image data in the first drive mode until a photographing instruction is performed.

5. The imaging device according to claim 4, wherein the control unit determines a change of the photographed scene from a change of the light measurement value acquired through the light measurement calculation using the processing unit.

6. The imaging device according to claim 1, further comprising:
the at least one process and at least one memory further function as a detection unit configured to detect an angular velocity of panning or tilting of the imaging device,
wherein the processing unit sets the driving of the light measurement sensor to the first drive mode and performs an operation of detecting a motion vector of a subject between consecutive frames, and
the control unit determines whether or not panning is performed using the motion vector detected by the processing unit and the angular velocity detected by the detection unit.

7. The imaging device according to claim 6, wherein the processing unit sets parameters used for first accumulation of the light measurement sensor in the first drive mode and stores the parameters in a storage unit, performs the light measurement calculation and detects the motion vector after the first accumulation, reads parameters from the storage unit in second accumulation of the light measurement sensor, and detects the motion vector after the second accumulation using the parameters.

8. The imaging device according to claim 1, wherein the at least one process and at least one memory further function as a setting unit configured to set an amount of background flow at the time of panning, and
the control unit performs a process of giving a notification that the amount of flow set by the setting unit is unable to be obtained even when photographing is performed at a determined shutter speed.

9. The imaging device according to claim 8, wherein the control unit limits a setting range of the amount of flow by the setting unit, when a mode of reducing an influence of flicker is set at the time of panning.

10. The imaging device according to claim 6, wherein the imaging device includes a correction unit configured to perform correct an image blur, and
when a mode of supporting panning is set, the control unit calculates an angular velocity of the subject with respect to the imaging device from the detected motion vector and angular velocity and controls the correction unit, thereby an image blur associated with the subject at the time of panning being corrected.

11. An imaging device comprising
at least one processor and at least one memory functioning as:
a processing unit configured to perform a process of detecting flicker of a photographed scene; and
a control unit configured to perform exposure control at the time of panning for photographing a moving subject,
wherein, when flicker is detected by the processing unit at the time of panning, the control unit limits an upper limit value of a shutter speed which can be set when determining the shutter speed as compared with a case in which flicker is not detected at the time of panning, and wherein the processing unit selectively performs a light measurement calculation process of acquiring the brightness of the subject on the basis of an image data obtained using a light measurement sensor and a process of detecting flicker of a photographed scene on the basis of the image data obtained using the light measurement sensor.

12. A control method to be executed by an imaging device, comprising:

a processing step of performing a process of detecting flicker of a photographed scene; and a control step of performing light exposure control at the time of panning of photographing a moving subject, wherein, when the flicker is detected at the time of panning, in the control step, when a shutter speed is determined, a process is performed to limit an upper limit of the shutter speed which is able to be set further than that when flicker is not detected at the time of panning, and a processing step of performing a light measurement calculation process of setting driving of a light measurement sensor to a first drive mode and acquiring brightness of the subject, and a step of setting the driving of the light measurement sensor to a second drive mode to detect flicker of a photographed scene.

13. A control method to be executed by an imaging device, comprising:

a processing step of performing a process of detecting flicker of a photographed scene; and a control step of performing light exposure control at the time of panning of photographing a moving subject, wherein, when the flicker is detected at the time of panning, in the control step, when a shutter speed is determined, a process is performed to limit an upper limit of the shutter speed which is able to be set further than that when flicker is not detected at the time of panning, and a processing step of selectively performing a light measurement calculation process of acquiring the brightness of the subject on the basis of an image data obtained using a light measurement sensor and a process of detecting flicker of a photographed scene on the basis of the image data obtained using the light measurement sensor.

* * * * *